United States Patent
Kindo et al.

(10) Patent No.: US 7,162,487 B2
(45) Date of Patent: Jan. 9, 2007

(54) INFORMATION FILTERING SYSTEM AND INFORMATION FILTERING METHOD

(75) Inventors: Toshiki Kindo, Yokohama (JP);
Hideyuki Yoshida, Sagamihara (JP);
Taisuke Watanabe, Sagamihara (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 273 days.

(21) Appl. No.: 10/745,530

(22) Filed: Dec. 29, 2003

(65) Prior Publication Data

US 2004/0139054 A1    Jul. 15, 2004

Related U.S. Application Data

(62) Division of application No. 10/066,757, filed on Feb. 6, 2002, now Pat. No. 6,687,703, which is a division of application No. 09/219,436, filed on Dec. 23, 1998, now Pat. No. 6,363,383.

(30) Foreign Application Priority Data

Dec. 26, 1997 (JP) .................................. 9-368404

(51) Int. Cl.
*G06F 17/30* (2006.01)

(52) U.S. Cl. ..................................... 707/102
(58) Field of Classification Search ............. 707/1–10, 707/100–104.1, 200–206; 705/10, 26
See application file for complete search history.

(56) References Cited

U.S. PATENT DOCUMENTS

| | | | |
|---|---|---|---|
| 6,006,332 A | 12/1999 | Rabne et al. | |
| 6,029,161 A | 2/2000 | Lang et al. | |
| 6,041,311 A | 3/2000 | Chislenko et al. | |
| 6,049,777 A * | 4/2000 | Sheena et al. | 705/10 |
| 6,064,971 A | 5/2000 | Hartnett | |
| 6,064,980 A * | 5/2000 | Jacobi et al. | 705/26 |
| 6,092,049 A | 7/2000 | Chislenko et al. | |
| 6,112,186 A * | 8/2000 | Bergh et al. | 705/10 |
| 6,112,188 A | 8/2000 | Hartnett | |
| 6,134,532 A | 10/2000 | Lazarus et al. | |
| 6,144,964 A * | 11/2000 | Breese et al. | 707/10 |
| 6,202,058 B1 | 3/2001 | Rose et al. | |
| 6,275,825 B1 | 8/2001 | Kobayashi et al. | |
| 2003/0158960 A1 | 8/2003 | Engberg | |

FOREIGN PATENT DOCUMENTS

| | | |
|---|---|---|
| JP | 9-288683 | 11/1997 |
| JP | 10-240762 | 9/1998 |

* cited by examiner

*Primary Examiner*—Diane Mizrahi
(74) *Attorney, Agent, or Firm*—Michael G. Gilman

(57) ABSTRACT

The present invention aims to effectively restrict access of a general user to an inappropriate information piece at the judgment of an information manager. In order to pick up a desired information from an information storage medium or an information communication network while excluding inappropriate information, an information manager inputs suitability of information (a teacher signal) to an information presented at a user terminal 21 to a group profile learning unit 16 and prepares a group profile reflecting suitability of the information as specified by the information manager using the teacher signal. At a score calculating unit 13, a score signal indicating suitability of information is calculated for each information using the group profile, and access of an information user in a group to inappropriate information is restricted.

5 Claims, 3 Drawing Sheets

FIG. 3

| PY | PN | |
|---|---|---|
| GKW1 | QY1 | QN1 |
| GKW2 | QY2 | QN2 |
| GKW3 | QY3 | QN3 |
| GKW4 | QY4 | QN4 |
| .. | .. | .. |
| GKWm | QYm | QNm |

INFORMATION FILTERING SYSTEM AND INFORMATION FILTERING METHOD

This application is a division of application Ser. No. 10/066,757 filed Feb. 6, 2002, now U.S. Pat. No. 6,687,703, which is a division of U.S. patent application Ser. No. 09/219,436 filed Dec. 23,1998, now U.S. Pat. No. 6,363,383.

BACKGROUND OF THE INVENTION

1. Field of the Invention

The present invention relates to an information filtering system and an information filtering method for restricting access to an unnecessary or inappropriate information when information is picked up from a storage device or an information communication network using electrons, light, etc. as medium.

2. Description of the Related Art

With rapid progress and development of social conditions for information communication in recent years, there are strong demands on the development of an information filtering system, which can cope with expansion of the scale of information communication network and extreme increase of the volume of communication. In this respect, the present applicant has developed an information filtering system, by which it is possible to easily pick up an information highly required or interesting for users, and patent applications have been filed as Japanese Patent Applications 8-230012 and 9-46384. The Japanese Patent Application 8-230012 has been publicized as JP-A-9-288683. The Japanese Patent Application 9-46384 is not yet publicized.

By the conventional technique as described above, it is possible to efficiently pick up an information interesting to a user from an enormous amount of information and to provide it to the user, while it is not possible to restrict access to an information, which is considered as inappropriate to the user.

SUMMARY OF THE INVENTION

To solve the above problem, it is an object of the present invention to provide an information filtering system and an information filtering method, by which it is possible to restrict access to an information inappropriate to the user when seen from the standpoint of an information manager, i.e. a person in charge of information management, and to pick up only an appropriate information.

To attain the above object, the following measures are taken in the present invention:

According to the present application, there is provided an information filtering system, which comprises score calculating means for calculating a score signal to quantitatively evaluate whether an information picked up from an information storage medium or an information communication network is appropriate or not for an information user or for a group, to which an information user belongs, and access control means for controlling access to the information by comparing the score signal with a threshold determined in advance.

According to the present application, there are provided an information filtering method and a medium in which a program for effecting the method is prerecorded in such a manner that it is readable by a computer, wherein the method comprises the steps of calculating a score signal for quantitatively evaluating whether an information picked up from an information storage medium or an information communication network is appropriate or not for an information user or for a group, to which the information user belongs, and controlling access to the information by comparing the score signal with a threshold determined in advance.

With such an arrangement as described above, it is possible to attain an effect to restrict access of the user to an inappropriate information.

The invention has a structure in an information filtering system of claim 1, such that the score calculating means calculates a group profile signal to be prepared from a key word picked up from the information already in access and from a result of judgment of an information manager as to whether the information already in access is appropriate or not, and also calculates a score signal based on the key word picked up from the information, to which access is to be made.

This invention has a structure in an information filtering method and a medium, in which a program for effecting the method is prerecorded, of claims 4 and 7, such that the method comprises the steps of preparing a group profile from the key word picked up from the information already in access and a result of judgment of the information manager as to whether the information already in access is appropriate or not, and calculating a score signal from the group profile and the key word picked up from the information.

With such an arrangement, it is possible to attain an effect to restrict access of general users to inappropriate information based on the group profile reflecting judgment of the information manager, i.e. a person in charge of information management.

The information according to this invention provides an information filtering system that comprises access recording means for recording key word for characterizing the information already in access, and group profile learning means for updating the group profile signal based on a teacher signal inputted by an information manager to an information with key word thereof newly recorded in the access recording means.

The invention according to this invention provides an information filtering method or a recording medium in which a program for effecting the method is prerecorded in such a manner that it is readable by a computer wherein the method comprises the steps of sequentially recording key words for characterizing the information already in access and updating the group profile signal based on a teacher signal inputted by the information manager to the information with key word thereof newly recorded.

With the arrangement as described above, it is possible to attain an effect to accurately reflect the judgment of the information manager to the group profile signal used for calculation of the score signal and to restrict access of the user to an inappropriate information.

BRIEF DESCRIPTION OF THE DRAWINGS

These and other objects and features of the present invention will become apparent from the following detailed description taken in conjunction with the accompanying drawings in which:

FIG. 3 is a conceptual drawing showing a form of a group profile.

MODE FOR CARRYING OUT THE INVENTION

Figure 1:
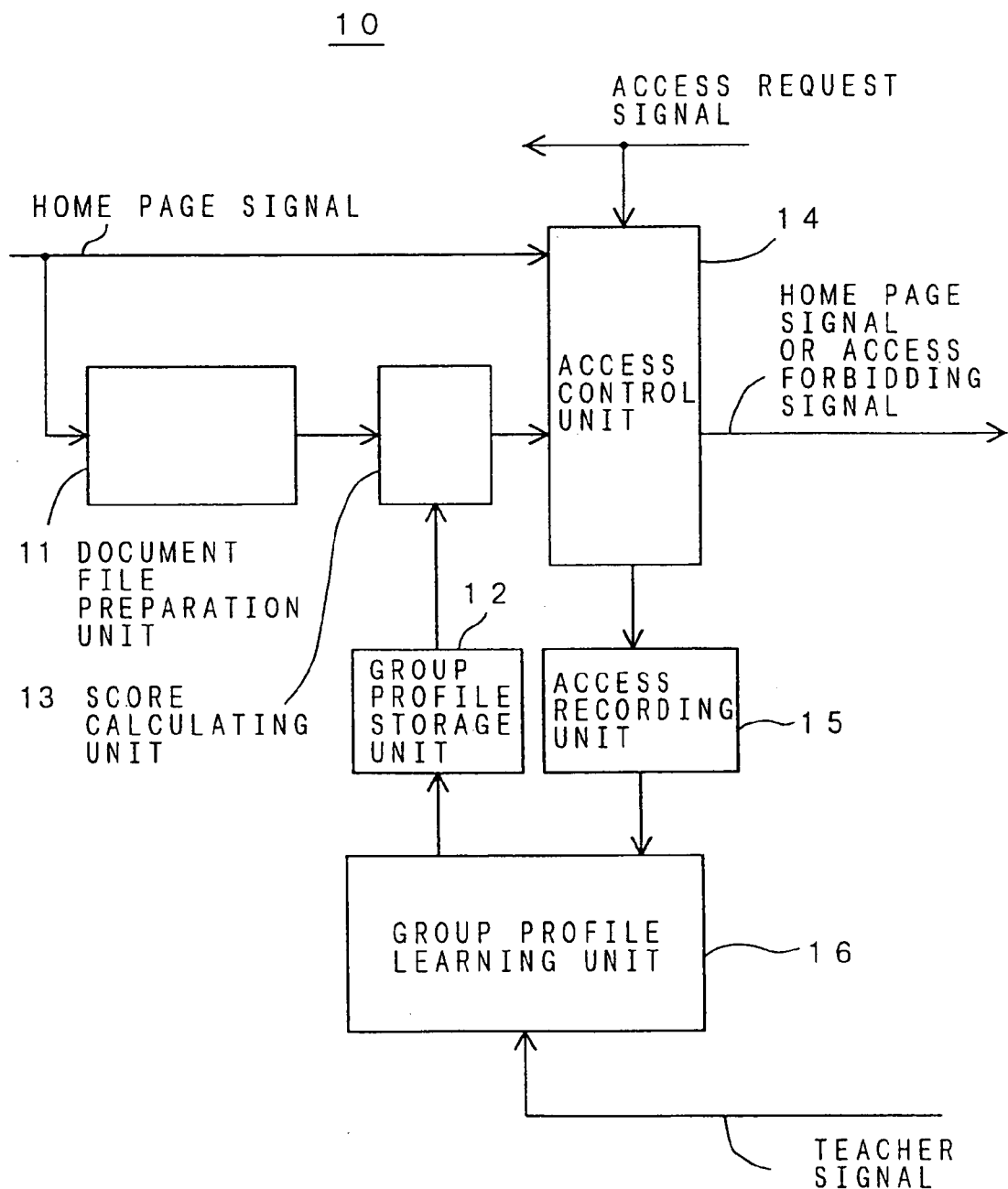
FIG. 1 is a functional block diagram of an information filtering system according an embodiment of the present invention.

In the following, description will be given on an embodiment of the present invention referring to FIG. 1 to FIG. 3:

FIG. 1 is a block diagram showing functional blocks of an information filtering system of an embodiment of the present invention. In the following, an example is given on a case where an information picked up from a host computer is filtered by making access, from a user terminal having browser function, to the host computer, which provides information on Internet.

An information filtering system 10 as shown in FIG. 1 relays an access request signal to a host computer, providing home pages, to which access is to be made, while the information filtering system receives the information of the host computer, to which access is to be made (hereinafter referred to as "home page signal").

The information filtering system 10 comprises a document profile preparation unit 11 for preparing a document profile signal DP(HP(AR)) to characterize a home page signal HP, a group profile storage unit 12 for storing a group profile signal GP to determine suitability of the information to a group, a score calculating unit 13 for calculating a score signal S(DP(HP(AR))), which is a signal to quantitatively evaluate suitability of the information to the group of the home page signal HP using the document profile signal DP(HP(AR)) and the group profile signal GP, and an access control unit 14. The access control unit 14 receives an identification signal ID of the user who requests access, the score signal S(DP(HP(AR))), the home page signal HP, and the document profile signal DP(HP(AR)), and if the identification signal ID is that of a general user, the score signal S(DP(HP(AR))) is compared with a threshold TH set by a person in charge of information management, and in case it is higher than the threshold TH, the home page signal HP is transmitted, and in case it is lower than the threshold TH, an access forbidding signal AF is transmitted to the requesting user terminal. If the identification signal ID is that of the person in charge of information management, i.e. an information manager, the home page signal HP is sent at all times.

Also, the information filtering system 10 comprises an access recording unit 15 for recording the access request signal AR and the document profile signal DP(HP(AR)), and a group profile learning unit 16 for determining by the information manager whether an external home page with access request is appropriate or not along the record of the access request signal and for correcting the group profile signal GP using a teacher signal T inputted by the information manager and the document profile signal DP(HP(AR)).

Figure 2:
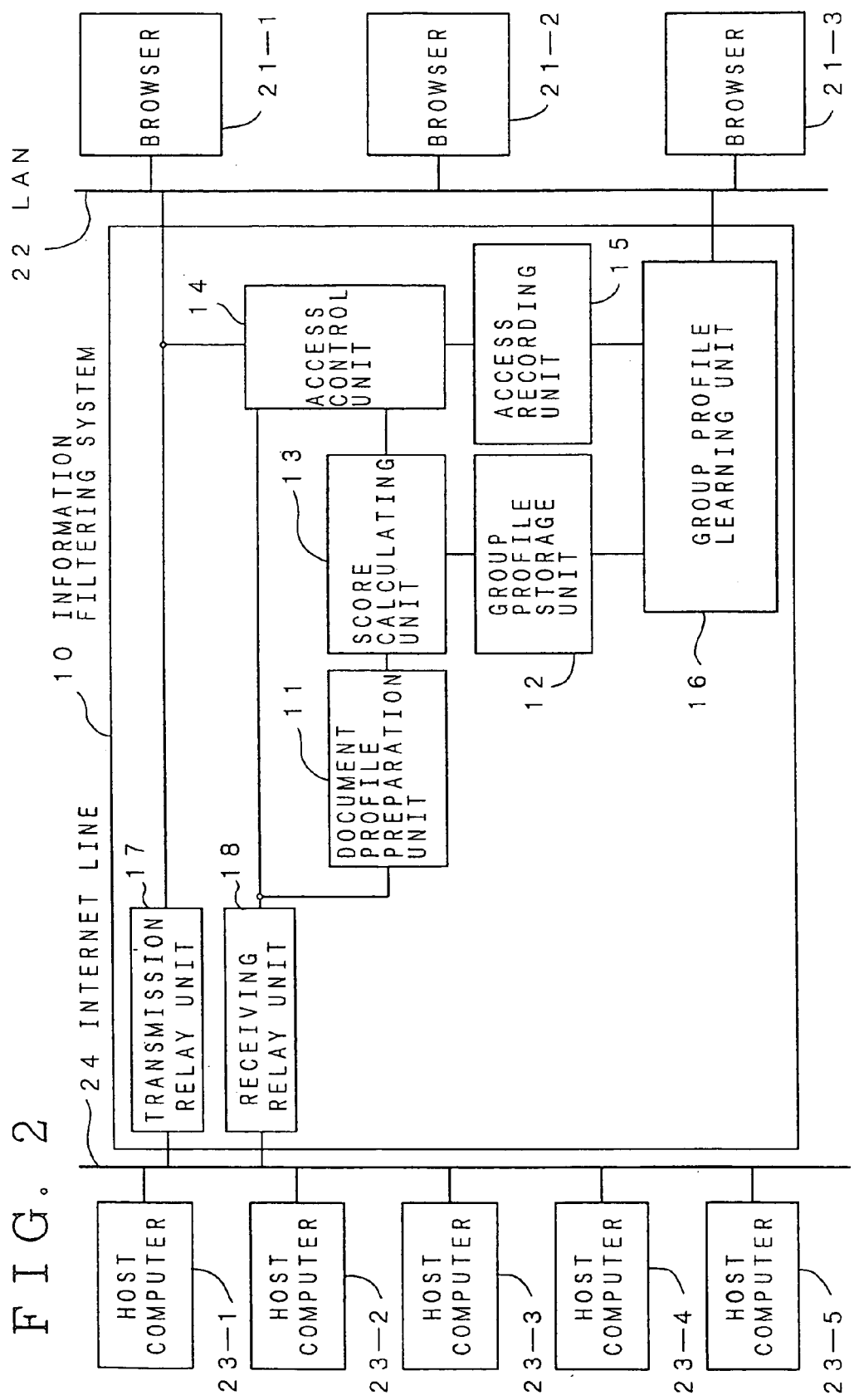
FIG. 2 is a block diagram of a system, to which the information filtering system of the above embodiment is applied.

FIG. 2 shows a system configuration in a case where the information filtering system 10 is used for information filtering of Internet. Reference numerals 21-1 to 21-3 each represents a user terminal provided with browser function and connected to LAN 22, and access can be made only to the information filtered by the information filtering system 10 except the information manager.

On the other hand, reference numerals 23-1 to 23-5 each represents a host computer providing information over Internet and giving the information, for which access has been requested via Internet line 24. Here, there is no restriction on the information provided by the host computers 23-1 to 23-5, and it is supposed that all of the information provided by the host computers 23-1 to 23-5 are home page signals HP following the usage of Internet.

In addition to the functional blocks as described above, the information filtering system 10 comprises a transmission relay unit 17 for relaying the access request signal AR outputted from the user terminals 21-1 to 21-3 to the host computer, to which access is requested, and a receiving relay unit 18 for receiving the home page signal HP transmitted from the host computer and for inputting the signal to the desired functional block.

Now, description will be given on operation of the present embodiment with the above arrangement.

The user transmits user's own identification signal ID and an access request signal AR for making access to the home page signal HP of an external host computer 23-1 via a user terminal 21-1.

The information filtering system 10 relays the access request signal AR received from the user terminal 21-1 to the host computer 23-1 and acquires data for the home page signal HP from the host computer 23-1. The home page signal HP thus acquired is analyzed, and it is compared with criteria to determine the suitability of the information as determined by the information manager. If it is judged as appropriate, the home page signal HP is sent to the user terminal 21-1, which issued the access request signal AR. In case it is judged as inappropriate, an access forbidding signal AF indicating that the access to the home page signal HP is not allowed is transmitted to the user terminal 21-1, which issued the access request signal AR. If the identification signal ID is that of the information manager, it is transmitted to the requesting user terminal without judging the suitability of the information.

Next, description will be given on concrete details of operation of the information filtering system 10.

First, description will be given on preferred forms of the document profile signal DP(HP) and the group profile signal GP. The document profile signal DP(HP) may be any signal if it characterizes the home page signal HP. The preferred forms of signal are as follows:

(1) Home page address
(2) Key words taken from the sentence in the home page (generally, character string)
(3) Link information In addition to the above, as the signal effective to characterize the home page, there are ratios of image data and character data. To simplify the matter in the following explanation, it is supposed that home page address, key word, and link information are all character strings and these are considered as key words in broader sense and that the document profile signal DP(HP) is key word group signals (in broader sense) (KW1 (HP), KW2(HP), . . . , KWn(HP)) picked up from the home page HP. The document profile signal DP(HP) is given in the equation (1).

$$DP(HP)=(KW1(HP), KW2(HP), \ldots, KWn(HP)) \quad (1)$$

The group profile signal GP comprises the document profile signal DP(HP) and the teacher signal T from the information manager, and as shown in FIG. 3, it is reflecting input condition of the key words and the teacher signal. In FIG. 3, PY represents the number of times of the cases where the information manager judged as appropriate, and PN is the number of times of the cases where the information manager judges as inappropriate. GKWx (x=1, 2, . . . , m) represents key words, and QYx represents the number of times of the cases where the information manager judged as appropriate to the home page signal including the key words GKWx. QNx represents the number of the times of the cases where the information manager judges as inappropriate to the home page signal including GKWx. Initial condition of the information filtering system 10 is a non-learning condition, and the group profile signal GP is expressed by the equation (2), and the threshold TH of the access control unit 15 is set to 0.

$$\left.\begin{array}{l} PY = 0 \\ PN = 0 \\ GKWx \text{ is blank}; \ QYx = 0, \ QNx = 0 \ (x = 1, 2, ..., m) \end{array}\right\} \quad (2)$$

The group profile signal GP stored in the group profile storage unit 12 is updated by updating the result of judgment of the information manager on the suitability to the document profile signal DP(HP) from the user terminal using the teacher signal T.

For example, in case the information manager has knowledge of a host computer, which distributes inappropriate external information (home page), the information manager transmits, via the user terminal 21, the access request signal AR specifying the host computer, which distributes the inappropriate information.

The transmission relay unit 17 of the information filtering system 10 relays the access request signal AR to the host computer 23-2. The host computer 23-2 sends back the inappropriate information, i.e. the home page signal HP(AR), to the receiving relay unit 18 of the information filtering system 10. The receiving relay unit 18 transmits the home page signal HP(AR) to the access control unit 14 and the document profile preparation unit 11.

The document profile preparation unit 11 picks up key word from the home page signal HP(AR) by a predetermined method (such as morphological analysis) and prepares the document profile signal DP(HP(AR)) as given in the equation (3), and transmits it to a score calculating unit 13.

$$DP(HP(AR)) = (KW1(HP(AR)), \ldots, KWn(HP(AR))) \quad (3)$$

The score calculating unit 13 calculates the values of $SKW(KW_i)$ in the equation (4) on each of the key words included in the document profile DP(HP(AR))

$$SKW(KW_i) = \sum_{j=1}^{m} \delta(KW_i, GKW_j)(SKCY - SKCN) \quad (4)$$

where $$\begin{cases} \delta(KW_i, GKW_j) = \dfrac{\text{In case of 1 or } KW_i = GKW_j}{\text{In case of 0 or other case}} \\[6pt] SKCY = \left\{ \dfrac{\text{In case of 0 or } PY = 0}{\text{In case of } q_j \log\left[\dfrac{q_j}{p}\right] \text{ or other case}} \right. \\[10pt] SKCN = \left\{ \dfrac{\text{In case of 0 or } PN = 0}{\text{In case of } (1-q_j)\log\left[\dfrac{1-q_j}{1-p}\right] \text{ or other case}} \right. \\[10pt] P = \dfrac{PY}{PY + PN} \\[6pt] q_j = \dfrac{QY_j}{QY_j + QN_i} \end{cases}$$

The total sum score thus obtained is $$SCORE = \sum_{i=1}^{n} SKW(KW_j) \quad (5)$$

This is considered as a score signal S, and it is sent to the access control unit 14 together with the document profile signal DP(HP(AR)).

In the access control unit 14, all key words are turned to 0 with respect to the group profile GP in initial state, and the score signal S is turned to the same value as the threshold TH, and it is turned to a state where access is allowed. Since the user of the user terminal 21-1 is the information manager, the access control unit 14 transmits the home page signal HP(AR) to the user terminal 21-1 regardless of the value of the score signal S. Also, the access request signal AR, the score signal S(DP(HP(AR))) and the document profile signal DP(HP(AR)) are written to the access recording unit 15 as an access recording signal AL.

$$AL = (AR, S(DP(HP(AR))), DP(HP(AR))) \quad (6)$$

At the user terminal 21-1 of the information manager, the home page signal HP(AR) as picked up from the host computer 23-2 is displayed. The inappropriate information displayed at the user terminal 21-1 of the information manager is judged by the information manager as "inappropriate", and a teacher signal T=(inappropriate, AR), judging that "the home page HP(AR) signal distributed by access request signal AR as an inappropriate signal" is sent to the group profile learning unit 16.

Upon receipt of the teacher signal T, the group profile learning unit 16 reads the access recording signal AL containing the access request signal AR included in the teacher signal T. Now, it is judged that "the access request signal AR is inappropriate", and the group profile learning unit 16 updates the group profile signal from the initial stage as shown in the equation (7).

$$\left.\begin{array}{l} PY = 0 \\ PN = 1 \\ GWx = KWx, \ QYx = 0, \ QNx = 1, \ (x = 1, \ldots, n) \\ GWx = blank, \ QYx = 0, \ QNx = 0, \ (x = n+1, \ldots, m) \end{array}\right\} \quad (7)$$

Suppose that the group profile signal is in the state of the equation (7) and that a general user other than the information manager tries to make access to the inappropriate home page as described above via the user terminal 21-3. Then, the score signal S calculated by the score calculating unit 13 is a negative value lower than the threshold TH. Thus, not the home page signal HP (AR), but the access forbidding signal AF is displayed at the user terminal 21-3 from the access control unit 14.

For the appropriate home page, the information manager can register it in the group profile by similar method. By inputting a number of judgments as to whether it is an appropriate home page or an inappropriate home page (e.g. 50 cases), it is possible to prepare a group profile (equation (8)) as given below, restricting the access to inappropriate pages with high accuracy.

$$PY = 28 \\ PN = 22 \\ GW1 = Violence, QY1 = 0, QN1 = 13, \\ GW2 = Bloodshed, QYx = 2, QNx = 10, \\ GW3 = Bizarrerie, QYx = 0, QNx = 8, \\ \ldots \\ GWm = Natural\ science, QYm = 20, QNx = 0,$$ (8)

The maintenance of the information filtering system 10 is as follows:

When general users other than the information manager make access by j times to an external home page from the user terminals 21-1 to 21-3 after the information manager has set the group profile signal GP, the recording of the access (equation (9)) is recorded at the access recording unit 15 as an access recording signal ALk.

$$ALk = (ARk, Sk, DPk), k=1, \ldots, j \qquad (9)$$

The information manager checks the access request signal ARk recorded at the access recording unit 15 via one of the user terminals 21-1 to 21-3 and confirms that the setting has been properly made that the score signal Sk is higher than the threshold TH in case the manager's own judgment is "appropriate" and the score signal Sk is lower than the threshold TH in case the judgment is "inappropriate". If there is an error, the teacher signal T should be inputted by the above procedure to correct the group profile GP.

As described above, according to the present embodiment, in order to pick up a desired information while excluding inappropriate information from the information communication network, it is designed in such manner that the manager inputs the suitability (teacher signal) of the information to the designated information via the user terminal 21-1 and that the score signal indicating suitability of the information can be calculated for each signal by preparing the group profile reflecting the suitability of the information as specified by the manager using the teacher signal. As a result, it is possible to utilize the score signal calculated by the group profile and to restrict the access to the information. Therefore, the information manager can restrict access to inappropriate information by a general user of the group by simply judging that the information is appropriate or not and by inputting it to the information filtering system.

In the above, description has been given on a case where the information filtering system of the present invention is applied to a system for automatically filtering inappropriate information when information is picked up from the information communication network, while the present invention can be applied not only to an information communication network such as Internet but also to any type of system, which picks up information directly from a storage device using electrons or light as medium.

Also, there is no need to arrange the information filtering system on the same LAN 22 as that of the user terminals 21-1 to 21-3 having browser function as shown in FIG. 2, and it can be arranged in the user terminal or over an external network or in a host computer which distributes information. In order to carry out the method of the present invention by a computer, it is possible to record a program for carrying out the method on a recording medium such as floppy disk, CD, DVD, etc. in a condition readable by the computer.

As described in detail in the above, an information filtering system and an information filtering method can be provided, which can restrict access to an information inappropriate to the user as seen from the standpoint of the information manager and which can pick up only appropriate information.

While preferred embodiments of the invention have been described hereinabove, it should not be understood that the present invention is limited to these embodiments, and therefore, various modifications and variations of the present invention may be made without departing from the scope of the present invention which is defined by the following claims.

What is claimed is:

1. An information filtering system, comprising:
    score calculating means for calculating a score from first information that is adapted to be picked up from an information storage medium or an information communications network, wherein said score is adapted to quantitatively evaluate whether access to said first information is appropriate or not for an information user, or for a group of information users to which an information user belongs; and
    access control means
        adapted to determine whether or not access to said first information should be denied to said information user by comparing said score with a predetermined threshold, and
        adapted to transmit a signal, indicating that the access to said first information is not allowed, to a user terminal, from which said information user requested said first information, when said calculated score signal is inconsistent with said threshold.

2. The information filtering system according to claim 1, wherein said score calculating means is adapted to produce a group profile signal adapted to be prepared from both at least one key word picked up from a second information that has previously been accessed and a result of judgment of an information manger as to whether the second information is appropriate or not, and is adapted to calculate the score based on said group profile signal and at least one key word identified in the first information.

3. The information filtering system according to claim 2, further comprising: access recording means adapted to record at least one key word that is adapted to characterize the second information, and group profile learning means adapted to update the group profile signal based on a teacher signal that is inputted by the information manager in response to third information with at least one key word newly recorded in the access recording means.

4. The information filtering system according to claim 1, wherein said calculated score signal is smaller than said threshold.

5. The information filtering system according to claim 1, wherein the access control means is adapted to cause the user terminal to display a message indicating that access to said first information is denied.

* * * * *